(12) United States Patent
Doerner

(10) Patent No.: US 9,851,926 B2
(45) Date of Patent: Dec. 26, 2017

(54) LOG STRUCTURED BLOCK DEVICE FOR HARD DISK DRIVE

(71) Applicant: Quantum Corporation, San Jose, CA (US)

(72) Inventor: Don Doerner, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 370 days.

(21) Appl. No.: 14/728,038

(22) Filed: Jun. 2, 2015

(65) Prior Publication Data

US 2016/0357437 A1 Dec. 8, 2016

(51) Int. Cl.
| | |
|---|---|
| *G11B 5/09* | (2006.01) |
| *G06F 3/06* | (2006.01) |
| *G11B 20/14* | (2006.01) |
| *G06F 12/02* | (2006.01) |

(52) U.S. Cl.
CPC ........... *G06F 3/0676* (2013.01); *G06F 3/064* (2013.01); *G06F 3/0613* (2013.01); *G06F 3/0641* (2013.01); *G06F 12/0246* (2013.01); *G11B 20/1426* (2013.01)

(58) Field of Classification Search
None
See application file for complete search history.

(56) References Cited

U.S. PATENT DOCUMENTS

| | | | | |
|---|---|---|---|---|
| 2012/0203980 A1* | 8/2012 | Flynn | ................ | G06F 17/30949 711/154 |
| 2012/0284587 A1* | 11/2012 | Yu | ......................... | G06F 3/0608 714/773 |
| 2014/0279941 A1* | 9/2014 | Atkisson | ........... | G06F 17/30371 707/690 |
| 2014/0281260 A1* | 9/2014 | Peterson | ............... | G06F 3/0616 711/135 |
| 2014/0289449 A1* | 9/2014 | Ogata | ...................... | G06F 3/061 711/103 |
| 2015/0178191 A1* | 6/2015 | Camp | .................. | G06F 12/0246 711/103 |
| 2016/0004644 A1* | 1/2016 | Samanta | ............. | G06F 12/0891 711/3 |

\* cited by examiner

*Primary Examiner* — Tan X Dinh
(74) *Attorney, Agent, or Firm* — Eschweiler & Potashnik, LLC

(57) ABSTRACT

Example apparatus and methods provide a log structured block device for a hard disk drive (HDD). Data that is to be stored on an HDD is serialized and written as a series of data blocks using a sequential write. Information about where individual data blocks were supposed to be written (e.g., actual address, neighboring data blocks), where data blocks were actually written, and how often data blocks are accessed is maintained. During garbage collection, data blocks that are being accessed with similar frequencies may be relocated together, with the most frequently accessed (e.g., hottest) data blocks migrating to the outer cylinders of the disk and the least frequently accessed (e.g., coldest) data blocks migrating to the inner cylinders. Blocks stored in the same temperature regions that were intended to be located together when written may be repositioned to facilitate sequential reads.

15 Claims, 8 Drawing Sheets

LOG STRUCTURED BLOCK DEVICE FOR HARD DISK DRIVE

BACKGROUND

A hard disk drive (HDD) stores data on one or more platters that have a plurality of concentric cylinders. The platters spin to move different locations under a read/write head(s). The data stored by the HDD may be organized in files, objects, records, tables, byte-streams, or in other ways. In the early days of computing, an HDD may have stored data for a single computer running a single process. When data was written in this scenario, there was only a single place from which the data would be provided and only a single HDD to which the data would be written. When data was going to be read, there was only one HDD from which the data could be read and only one place to which the data would be provided. Since there was only a single source and a single destination, attention could be paid to optimizing the data for write efficiency, for read efficiency, or for balancing write and read efficiency.

As computing progressed, HDDs began to store data for multiple processes associated with a computer. Decisions concerning where to store any particular data had to be made, either explicitly when the data was stored, or implicitly by configuring a program or utility. Decisions also had to be made concerning how to write data that arrived from different processes at different times. Similarly, decisions concerning to where data was to be provided had to be made. File systems and operating systems facilitated virtualizing the storage devices and improved some of the decision making.

As computing progressed even further, computers may have begun to interact on the storage side with networks of HDDs and on the processing side with networks of processes or computers. In this scenario, the locations available to store data expanded exponentially and the number of processes seeking to store or retrieve data also expanded exponentially. Still, decisions concerning where or how any particular piece of data was to be stored may have been made on an as-needed basis using heuristics that were designed in a single-disk/single-process era. This new problem is unique to data storage systems that interact with multiple data providers. It is not the type of problem that has existed for a long time or for which a paper and pencil solution exists since the writing and positioning of electronic data is involved.

For many applications, HDD performance may be a significant concern. HDD write performance may be affected by how data is written (e.g., randomly, sequentially) and HDD read performance may be affected by how data is read (e.g., randomly, sequentially). Traditionally, HDDs provide higher performance when accessed sequentially instead of randomly. However, the ability to perform random access is one of the criteria by which HDD are selected over other storage devices (e.g., tape drives) for a system. Conventional file systems, operating systems, applications, device drivers, or other processes that may access an HDD may be aware of the sequential versus random performance concern. However, interactions between ever increasing layers of virtualization with ever increasing complexity may frustrate attempts to organize data for sequential access.

Advances in HDDs have produced increases in capacity. However, the increases in capacity have not been matched with equal increases in HDD performance, even while storage system designers may equate capacity with performance. The disconnect between capacity and performance may frustrate systems designers. Additionally, the disconnect may lead to inefficiencies in data storage, which in turn may lead to over-spending and excessive energy consumption. The disconnect between capacity and storage caused by conventional storage heuristics may cause a conventional HDD to have excess capacity at a given performance level. In one extreme example, an HDD may be "short stroked", where the fastest outer cylinders are used to store data to ensure the best possible transfer rate and the shortest seek latency. While the fastest outer cylinders may be over-utilized, middle and especially inner cylinders may be under-utilized, if even used at all.

Conventional systems may have sought to optimize write performance by using sequential writes, even for data from multiple processes. These conventional systems may have used log structured input/output (i/o) in attempts to produce more sequential writes. In log structured i/o, data is written to a device sequentially, in the order that the data arrives, regardless of a location intended for the data by the entity that provided the data to the log structured device. Thus, data from one source may be interleaved with data from other sources and the combined set of data written sequentially. Files may not be written contiguously. A log structured i/o device may maintain a block map that tracks where the data is actually written and where the entity that provided the data wanted the data to be written. Conventional log structured i/o tends to optimize writing over reading, which may lead to significant performance degradation when the data that was sequentially written needs to be read back in.

Log structuring may be implemented at the file system level. The file system may be responsible for assigning blocks to the data in the files managed by the file system. A file system may aggregate writes to files so that the writes are sequential and therefore faster than random writes. While the aggregation that leads to sequential writes may improve write speed, reads of a file that might be sequential in another file system may or may not be sequential in a log structured file system. For example, a file that might have been written contiguously in another system may not have been written contiguously in a log structured i/o device. Whether the read is sequential will depend on what else, if anything, was written at the same time as the file to be read. If the file to be read was the only thing written at the point in time when the file was written, then the file may have been written sequentially. However, if other data was written at the same time as the file to be read, then other data blocks may have been interspersed with the file to be read, which may in turn lead to non-sequential reads for the file. As HDDs store data for more and more processes associated with more and more computers, the likelihood that any single file will be written in isolation becomes less and less. Thus, HDD read performance may continue to suffer accordingly.

Log structuring has been employed in conventional solid state drives (SSD). Log structuring may be implemented at the block level in FLASH-based SSDs because this type of device is structured in pages that need to be erased before they can be rewritten. Log structuring is well suited to this type of device because writes are sequential and there is little to no penalty for non-sequential reads. When implemented in an SSD, log structuring may be referred to as a "FLASH translation layer." The block translation map produced by log structuring may be stored on the SSD.

While log structuring may provide improved write performance for SSDs without the corresponding read performance degradation found in HDDs, the log structuring approach for SSDs may be compromised by SSD garbage collection. An issue may occur during garbage collection because live data in a page on an SSD may need to be moved before the page can be reclaimed. Thus, garbage collection for SSD may constrain long-term write throughput of FLASH-based SSD. This garbage collection issue may be associated with the observed phenomenon that while SSDs may be very fast early in their deployment, they experience gradual degradation in performance after deployment.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Prior Art

Prior Art

DETAILED DESCRIPTION

Figure 1:
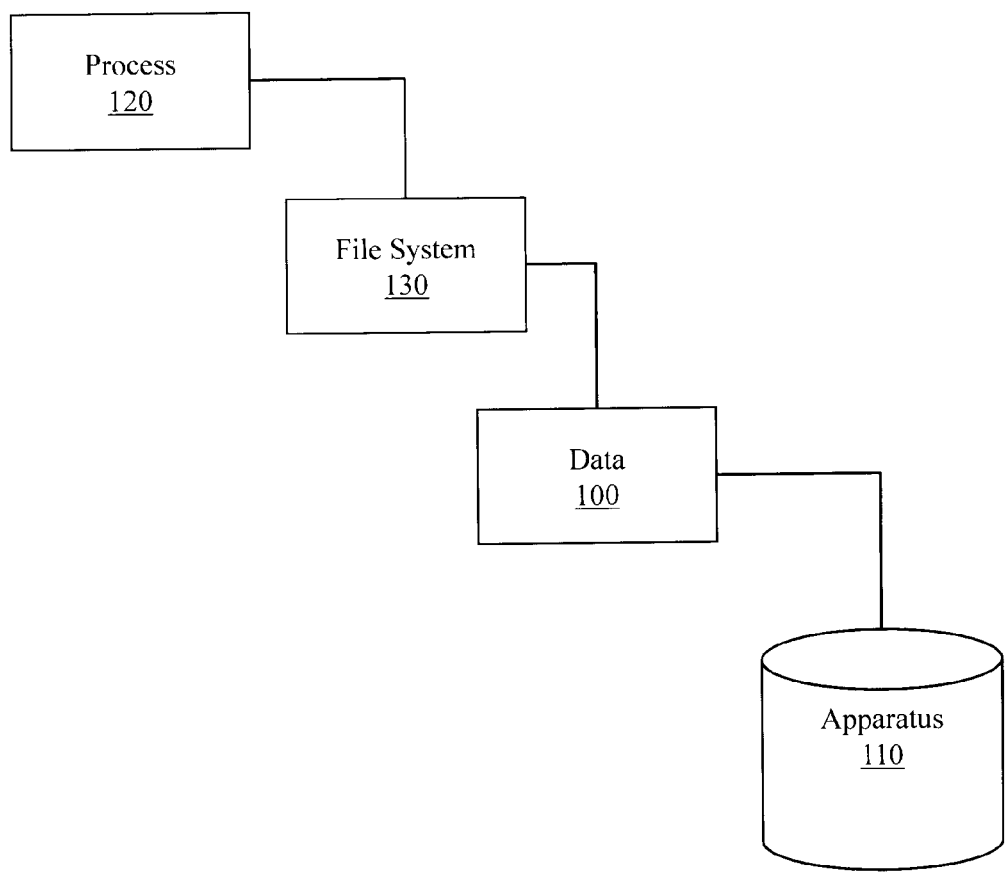
FIG. 1 illustrates data being provided to a hard disk drive (HDD).

Example apparatus and methods improve performance and efficiency for HDD systems. Example apparatus and methods provide a log structured block device that produces the efficiencies associated with sequential writes to an HDD while mitigating the issues of non-sequential reads experienced by conventional systems. An example log structured block device may serialize write operations, regardless of the source of the data to be written. Serialize, as used herein, means to arrange data blocks in an order. In one embodiment, serializing items includes arranging them in the order in which they were received. For example, data from different sources may be combined into a data set in the order in which they were received and then the entire data set may be written sequentially. An example log structured block device may also selectively reorganize data that was written to the HDD to improve or optimize read operations by increasing the likelihood of sequential reads. The selective reorganization uses a block map that is maintained during writing and relocation. The block map stores information about where a provider of data to be written wanted the data to be written and where the log structured block device actually stored the data. The information about where the provider wanted the data to be written may identify data blocks that were intended to be written together sequentially (e.g., blocks from a file, blocks from a data set). The information about where the provider wanted the data to be written may also identify physical block addresses.

The selective reorganization of data that was written to an HDD using log structured i/o may occur, for example, during background defragmentation of a device. The selective reorganization may be based, at least in part, on a heat map that tracks how often certain data is read or the frequency with which certain data is read. The term "heat map" refers to data or a data structure that tracks accesses to data written on the HDD. In one embodiment, when a block is touched (e.g., read, accessed) a value in the heat map is incremented. Accesses may cause a value for a block to be increased. Values may be decreased periodically (e.g., once per hour, once per day), in response to an event, in response to a signal, or at other times. In addition to being collocated to increase the likelihood of sequential reads, data that is more frequently read may be migrated to faster cylinders on a spinning platter while data that is less frequently read may be migrated to slower cylinders on the spinning platter.

Thus, example apparatus and methods improve over conventional systems by optimizing for write performance at the time when data is written but then, over time, based on usage, re-optimizing for read performance. In one embodiment, a log structured block device is implemented using an extrinsic virtualization layer. Relocating data to improve read performance may be performed as part of a garbage collection or other selective relocation process.

Over time, due to data being trimmed, overwritten, or otherwise manipulated, parts of a log may become porous. Areas that are porous may have little live data and may have that live data interspersed with inactive data or empty locations. Log structured writes are performed sequentially and thus benefit from having large areas into which long sequential writes can be performed. Thus, data located in porous areas may be relocated so that the porous area becomes more suitable for sequential writes associated with a log structured i/o approach.

Conventional garbage collection may employ unsophisticated or even naïve heuristics to identify areas in which garbage collection may be performed. For example, a naïve approach may identify sufficiently large regions whose porosity indicates that garbage collection is appropriate. Data in these regions may be moved to the end of the log resulting in new areas that can be written sequentially by the log structured i/o device.

Some file systems may improve on this naïve garbage collection for log structured devices by applying a heuristic that related files or related blocks should be kept together. This heuristic may be based on the assumption that files in a single directory may be more likely to be accessed together than files from different directories and that data in a single file is likely to be read together. These types of file systems may bias the placement of live data that is moved during garbage collection so that data from the same file will be located together and so that files from the same directory are located together. Ideally, data from the same file would be positioned to facilitate sequential reads.

Example apparatus and methods employ more sophisticated heuristics to guide or control the relocation of live data during garbage collection or other relocations. Example apparatus and methods maintain a heat map for blocks stored on an HDD. The term "heat map" refers to a data structure or collection of data that stores information about access (e.g., read) activity for a block. Blocks that are read more often than other blocks may be referred to as "hot" blocks while blocks that are read less often than other blocks may be referred to as "cold" blocks. A block on an HDD is assigned a value that depends, at least in part, on how many times a block has been read, how frequently the block is read, or other accesses to the data already written to the HDD. In one embodiment, each time the block is read the value may be incremented or increased. The value for a block may also be decremented or reduced. For example, values for blocks may be reduced periodically, in response to a signal, in response to an event, or at other times.

When garbage collection occurs for an HDD, the position to which live data is relocated on the HDD may depend on the value in the heat map for a block. For example, data blocks with the highest values may be collocated in one area (e.g., first set of cylinders) to increase the likelihood of sequential reads of that data while data blocks with the lowest values may also be collocated to another area (e.g., different set of cylinders) to increase the likelihood of sequential reads of that data. In one embodiment, values for the heat map may be binned and data blocks associated with the different bins may be collocated. In one embodiment, the most frequently read data may be placed on the outer rings of the HDD. In one embodiment, data may be positioned from the outer rings to the inner rings in direct relation to the values in the heat map.

Once blocks that have similar heat map values have been identified, and once destination cylinders have been identified for blocks with those similar heat map values, additional refinements to the ultimate location for blocks to be relocated may be made. One additional refinement relocates data blocks having similar heat map values based, at least in part, on information from the log concerning the intended location for the block. The intended location for the block may be identified, for example, by the provider of the block. Recall that the block map stores the location intended by the provider of the block and the actual location used by the log structured block device. When data is moved during garbage collection, the actual location at which the block is located is updated but the original intended location may remain the same.

Over time, as garbage collection proceeds or is repeated, data will be repositioned with a first granularity based on the number of reads, read frequency, or other access data. This may increase the likelihood of sequential reads for the relocated data. For data that is read with similar frequencies, a finer granularity may be achieved by positioning together data that was intended to be positioned together. For example, data blocks from the same file or same data set may be positioned together. This may further improve the likelihood of sequential reads and thus improve HDD efficiency and performance.

Turning now to FIG. 1, data 100 is received at apparatus 110. Apparatus 110 may be, for example, an HDD. Data 100 may be associated with a file system 130 or a process 120. In the beginning, data 100 may have been received from a single location (e.g., single process) and would be written to a single location (e.g., apparatus 110). Optimizing the writing of data 100 to produce sequential writes was straightforward, as was optimizing the writing of data 100 to produce sequential reads. The single provider of data may have been able to easily control the manner in which the data was stored to optimize for either writing or reading.

Figure 2:
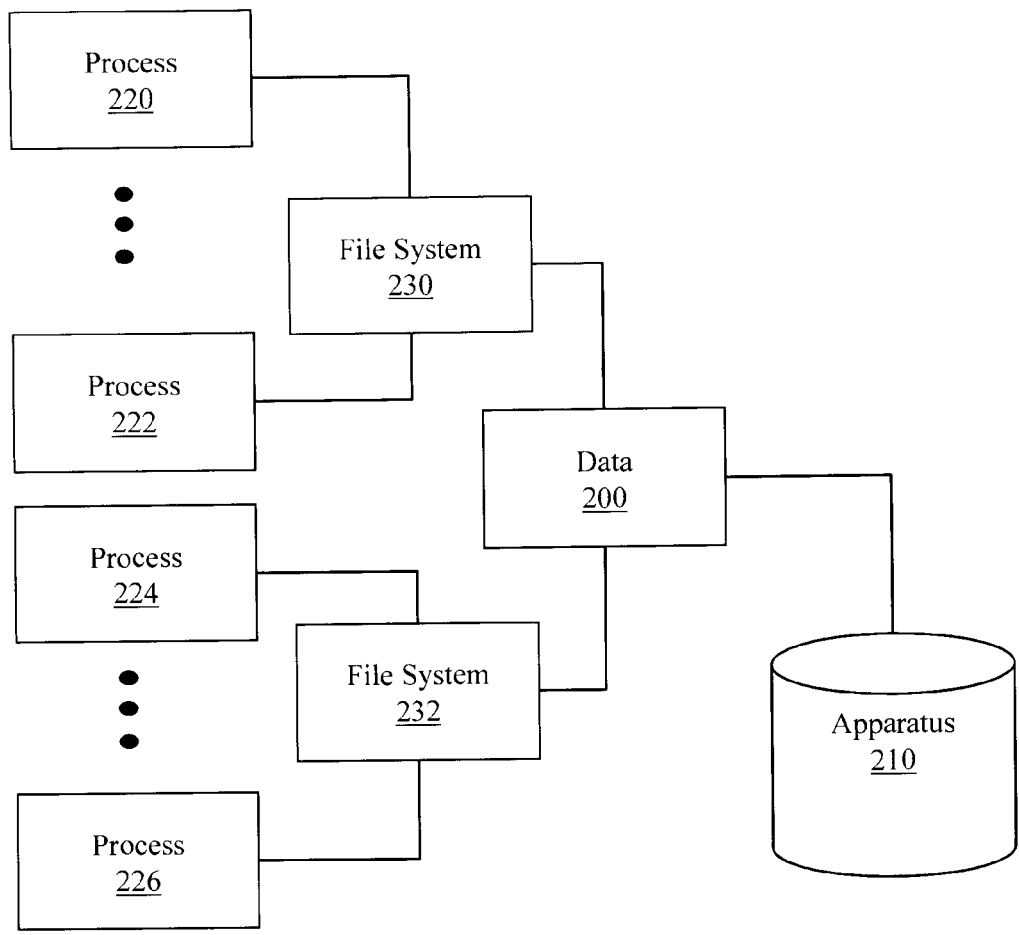
FIG. 2 illustrates data being provided to an HDD.

FIG. 2 illustrates data 200 being received at apparatus 210. Apparatus 210 may be, for example, an HDD. Data 200 may be received from multiple locations but is still stored at a single location. The multiple locations may include multiple processes, for example process 220 through process 222 and process 224 through process 226. The multiple locations may also include multiple file systems, for example file systems 230 and 232. The multiple locations produce different data at different times and thus data 200 may include a combination of data from the various sources. If apparatus 210 is a log structured device, then it may be straightforward to optimize apparatus 210 for sequential writes. However, conventional log structured devices may experience the undesired result of more frequent random reads as a result of the time-of-arrival based serialization of received data.

Figure 3:
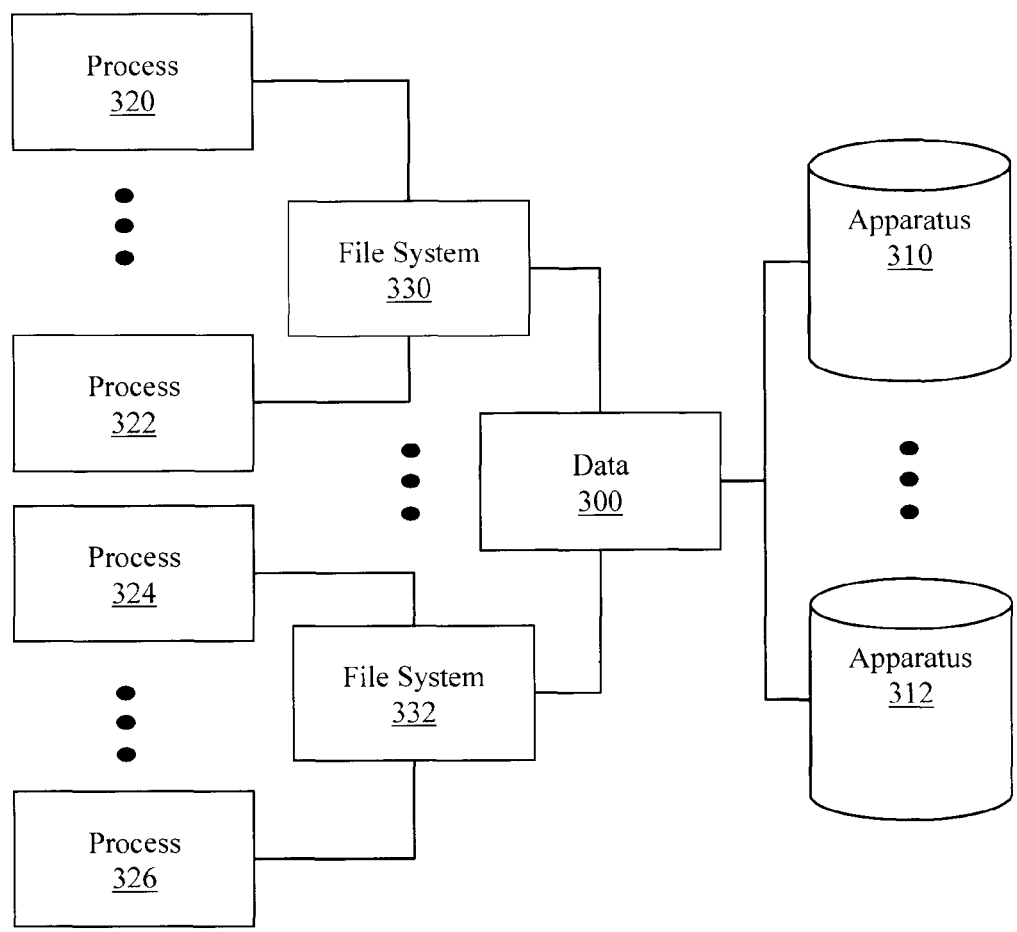
FIG. 3 illustrates data being provided to an HDD.

FIG. 3 illustrates data 300 being received at apparatus 310 and apparatus 312. Apparatus 310 and 312 may be, for example, hard disk drives. Data 300 is received from multiple locations and may be stored at multiple locations. For example, data 300 may be received from file systems 330 through 332 and from processes 320 through 322 and processes 324 through 326. It may have been possible to use a log structured device to produce sequential writes at the various HDD to which the data 300 is written. But the problems described above may have produced HDD performance that was significantly sub-optimal due, at least in part, to the serialization of data from multiple devices, file systems, processes, or other providers. The problems may be exacerbated when data that was intended to be written together is distributed onto different apparatus. For example, data that was intended to be written together may be stored partially on apparatus 310 and partially on apparatus 312. Example apparatus and methods facilitate improving the situation depicted in any of FIGS. 1-3. Example apparatus and methods provide a log structured block device that initially optimizes for sequential writes but then uses a heat map based approach to relocate data during, for example, garbage collection, to optimize for sequential reads.

The problem illustrated in FIG. 3 continues to expand as more and more processes store more and more data to more and more devices. In an environment like that depicted in FIG. 3, devices may face an unpredictable or random workload that compromises performance. Device utilization may be near 100%, but device performance may be well under that level. The problem illustrated in FIG. 3 may be exacerbated by certain types of drives (e.g., shingled magnetic recording (SMR)) drives. Thus, in one embodiment, the log structured block device may control data placement and relocation for an SMR drive.

Figure 4:
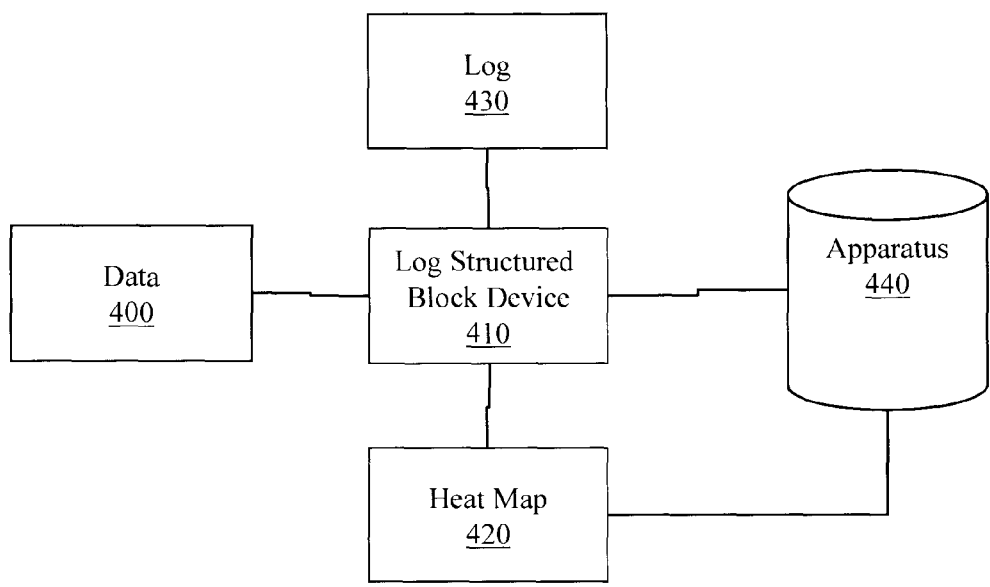
FIG. 4 illustrates data being processed by a log structured block device.

FIG. 4 illustrates data 400 being processed by a log structured block device 410 that maintains a heat map 420 and a log 430. Apparatus 440 may be, for example, an HDD or a shingled magnetic recording (SMR) drive. Log structured block device 410 optimizes writes of data 400 to apparatus 440 and then, over time, relocates data on apparatus 440 to improve HDD read performance and efficiency. Log structured block device 410 may, regardless of which file system or process provided blocks in data 400, write the blocks sequentially. The blocks may be written sequentially in the order they were received or may be subjected to some pre-processing or re-ordering in, for example, a write buffer. Log structured block device 410 maintains a log 430 of where data blocks were intended to be written and then where they were actually written. Log structured block device 410 also maintains a heat map 420 that tracks, for example, how frequently a block on apparatus 440 is accessed (e.g., read). Entries in the heat map 420 may be manipulated a first way (e.g., increased) when a block on apparatus 440 is accessed and may be manipulated another way (e.g., decreased) at different times under different conditions. For example, entries may be decreased periodically, upon the receipt of a signal, upon the occurrence of an event (e.g., new write of other data, new read of other data), or at other times.

When apparatus 440 is subject to garbage collection or other actions that will involve data relocation, log structured block device 410 may take the opportunity to relocate data to improve read performance. For example, data that is being read with similar frequencies or in similar numbers may be moved to similar regions of apparatus 400. Additionally, data that ends up in similar regions of apparatus 400 may then be relocated to enhance the possibility of sequential reads. In one embodiment, data that was intended to be written together (e.g., data from same file, data from same data set) can be relocated to actually be together (e.g., contiguous with respect to sequential reading). The intention that data was intended to be written together can be discerned from the log of intended write locations. In one embodiment, data that is observed to be read together is placed in locations that will increase the likelihood of sequential reads. In one embodiment, both intended locations and observed behavior may be considered. In one embodiment the observed behavior may trump the intended write locations and data that is actually read together may be placed together regardless of the originally intended write locations.

In one embodiment, to further improve performance and efficiency, data that is read most frequently or the most times will be put on outer cylinders of apparatus 400 while data that is read least frequently or a fewer number of times will be put on inner cylinders of apparatus 400. This may cause cylinders that are "in the middle" (e.g., neither outermost rings nor innermost rings) to be available for sequential writes by the log structured block device 400.

While a single apparatus 440 is illustrated, log structured block device 410 may store data on multiple HDD. Thus, in one embodiment, the relocation may include moving data between HDD. While log structured block device 410 is illustrated separate from apparatus 440, in one embodiment, log structured block device 410 may be incorporated into apparatus 440. For example, an ASIC, FPGA, or other circuit may be added to apparatus 440.

Figure 5:
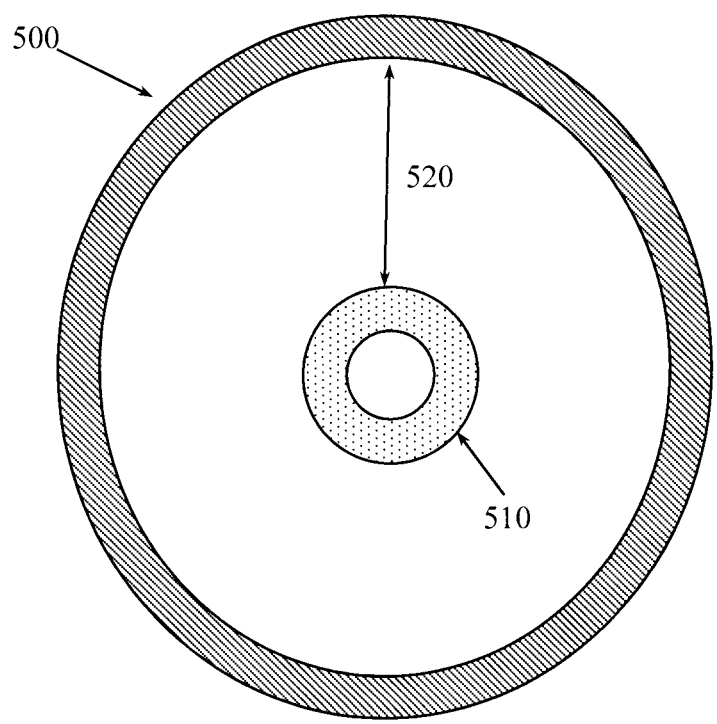
FIG. 5 illustrates different cylinder zones on a platter of an HDD.

FIG. 5 illustrates a spinning disk. The spinning disk includes an outermost region 500, an innermost region 510, and an in-between area 520. Data can be read most efficiently from outermost region 500 and least efficiently from innermost region 510. Data in the in-between area 520 is read less efficiently than area 500 but more efficiently than area 510. Example apparatus and methods may relocate data from in-between area 520 to area 500 or area 510 leaving appropriate sized areas to perform sequential writes in area 520.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 6:
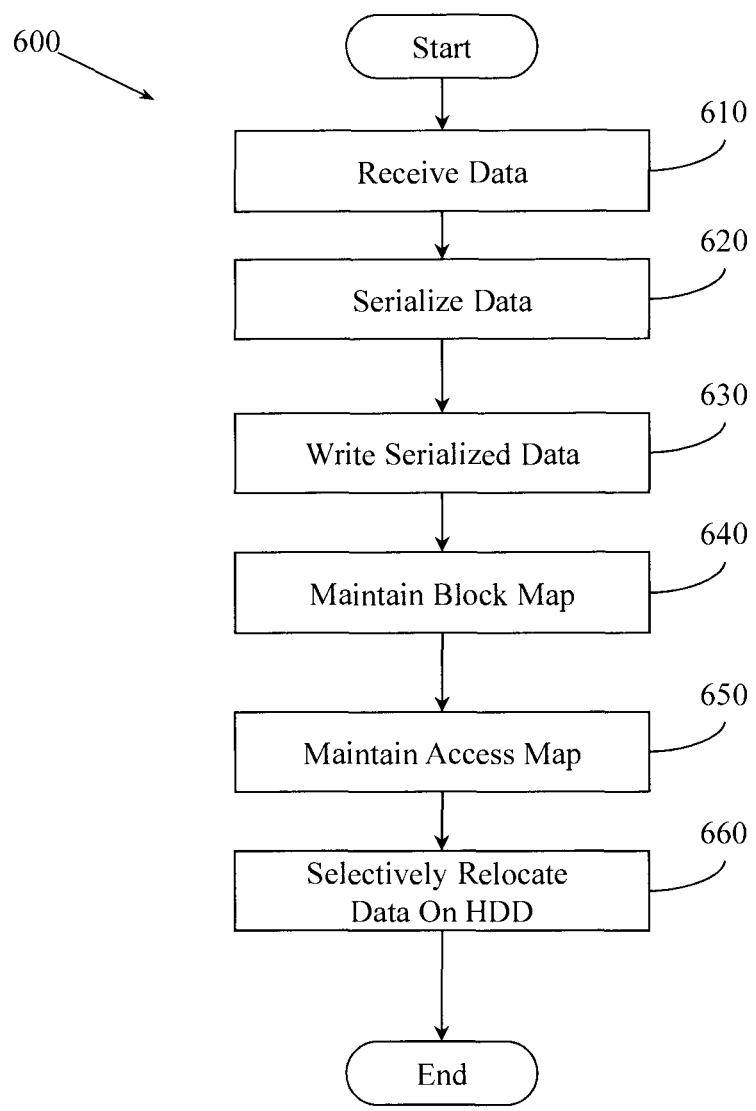
FIG. 6 illustrates an example method associated with improving HDD performance and efficiency using a log structured block device that performs selective data relocation.

FIG. 6 illustrates a method 600 associated with improving HDD performance and efficiency using a log structured block device that performs selective data relocation. Method 600 includes, at 610, receiving data to store on a hard disk drive (HDD). The HDD has at least one spinning platter. The spinning platter is configured with a plurality of concentric writeable cylinders. The HDD may be, for example, a shingled magnetic recording (SMR) device. The data may be received from one process, one file system or one device, or may be received from a plurality of processes, a plurality of file systems, or a plurality of devices.

Method 600 also includes, at 620, serializing the data to store. Serializing the received data into serialized data may include, for example, arranging the received data in the order in which it was received. As described above, when there are multiple providers of data, data that ought to be stored together (e.g., data from the same file) may be received at the same time as other data which may cause data that was intended to be stored together to be interspersed with other data. In one embodiment, serializing the data may therefore include moving a data block out of the order in which it was received and into an order determined by the presence of a related data block. For example, data that ought to be stored together may be recognized and data that was interspersed with this data that ought to be stored together may be moved out of the order in which it was received. The amount of re-organization that is performed before doing a sequential write may depend on the size of a write buffer available to method 600.

Method 600 also includes, at 630, writing the serialized data onto the HDD as a series of data blocks using a sequential write operation.

Method 600 also includes, at 640, maintaining a block map for the HDD. The block map may store at least two different types of information. For example, the block map may store information about locations at which data blocks on the HDD were intended to be stored and may also store information about locations at which data blocks are actually stored on the HDD. The information about where a block was intended to be stored may include, for example, information about desired neighbors. For example, if a series of data blocks all came from a single file, then the block map may store an identifier of the immediately preceding block from the single file, may store an identifier of the immediately succeeding block from the single file, and may store an identifier of the single file. This information may later facilitate relocating blocks from the file in an order that will yield more and longer sequential reads.

Method 600 also includes, at 650, maintaining an access map for the HDD. The access map stores values associated with accesses (e.g., reads) to data blocks stored on the HDD. In one embodiment, maintaining the access map includes, upon determining that a target data block on the HDD has been accessed (e.g., read), manipulating a value in the access map for the target data block to indicate that the target data block has experienced another access. For example, each time a data block is read, a read count for that data block may be manipulated in the access map. Manipulating the read count for the data block may include, for example, incrementing the read count or otherwise increasing the read count.

While a raw read count provides useful information, disk performance may depend more on what is currently happening rather than what happened a long time ago. Thus, in one embodiment, maintaining the access map includes manipulating the values of data blocks in the access map to indicate that the target data block has experienced one or more fewer accesses. In one embodiment, manipulating the values in the access map to indicate that the target data block has experienced one or more fewer accesses includes reducing (e.g., decrementing, decreasing) the values. For example, periodically, or in response to an event, the read count for data blocks may be decremented. Data blocks that continue to receive reads will continue to have increasing read counts while data blocks that are not receiving reads will eventually have zero read counts. The read count may therefore store information about how hot or cold a data block is, where a hot data block is one that is currently experiencing a threshold number of read counts and a cold data block is one that is currently experiencing less than the threshold number of read counts. With the information about which data blocks are currently experiencing the most reads available, a garbage collection process for the HDD can be used to improve read performance.

Therefore, method 600 also includes, at 660, selectively relocating a selected data block stored on the HDD as part of a garbage collection process. The relocation is based, at least in part, on the block map and the access map. Rather than simply appending a data block to the end of the log as is done conveniently, method 600 may make a more sophisticated selection for where to relocate a data block. Thus, selectively relocating the selected data block may include, for example, identifying a set of data blocks on the HDD that have an access value within a range that matches the access value for the data block. In different examples the range may be relative or discrete. For example, identification may be based on data blocks having the highest read counts, data blocks having read counts above a threshold, or in other ways. In one embodiment, data blocks may be ranked based on read count and then binned into an equal number of bins.

Once the set of data blocks has been identified, then the selected data block that has a similar read count or access value as the set of data blocks may be moved to a location on the HDD that is within a threshold distance of the set of data blocks. The threshold distance may be, for example, within a threshold number of cylinders or on the same cylinder. More generally, data blocks that have similar temperatures will be relocated to be positioned together.

In one embodiment, selectively relocating the selected data block may include a second step. The second step may include identifying, within the set of data blocks, a subset of data blocks that were meant to be stored contiguously. The data blocks that were meant to be stored contiguously may be identified from the organizational information in the block map. The organizational information may include, for example, preceding data blocks, succeeding data blocks, or file origins. In this embodiment, once data blocks that were meant to be stored contiguously are identified, method 600 may include moving at least one member of the subset of data blocks so that at least two members of the subset are stored contiguously.

Different regions on an HDD may have different performance characteristics. For example, it may be more efficient in terms of time or energy to perform i/o to the outermost cylinders of a HDD and it may be less efficient in terms of time or energy to perform i/o to the innermost cylinders of the HDD. The efficiency may be proportional to the distance from the outermost cylinders on the HDD. Thus, in one embodiment, selectively relocating the selected data block may include positioning the selected data block with respect to the outermost cylinder on the HDD so that the distance of the selected data block from the outermost cylinder on the HDD is inversely proportional to the value in the access map associated with the selected data block. More generally, the hottest data blocks may be positioned on the outermost cylinders and the coldest data blocks may be positioned on the innermost cylinders.

Figure 7:
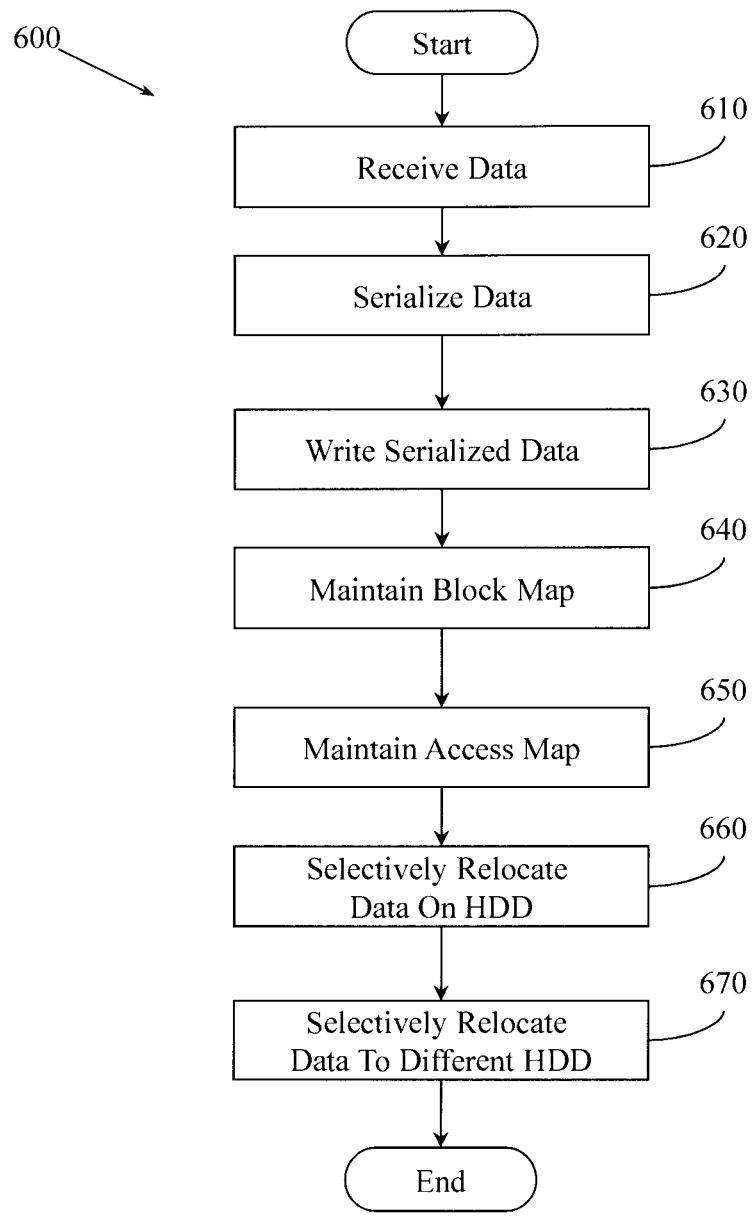
FIG. 7 illustrates an example method associated with improving HDD performance and efficiency using a log structured block device that performs selective data relocation.

FIG. 7 illustrates another embodiment of method 600. In this embodiment, method 600 includes, at 670, selectively relocating the selected data block to a different HDD. For example, the data that is being read most frequently may be moved to a first HDD and the data that is being read least frequently may be moved to a second different HDD. Computing efficiency and data storage efficiency may be improved by placing the data that is read most frequently on a more efficient hard disk drive and by placing the data that is read least frequently on a less efficient hard disk drive. Having disk drives with different capacities, efficiencies, energy costs, or other attributes, may increase the overall utility of a data storage system and reduce the overall cost of the data storage system. Thus, method 600 may include not only relocating data blocks on a single HDD but also migrating data blocks between different HDD.

In one example, a method may be implemented as computer executable instructions. Thus, in one example, a computer-readable medium may store computer executable instructions that if executed by a machine (e.g., processor) cause the machine to perform method 600. While executable instructions associated with method 600 are described as being stored on a computer-readable medium, it is to be appreciated that executable instructions associated with other example methods described herein may also be stored on a computer-readable medium.

Figure 8:
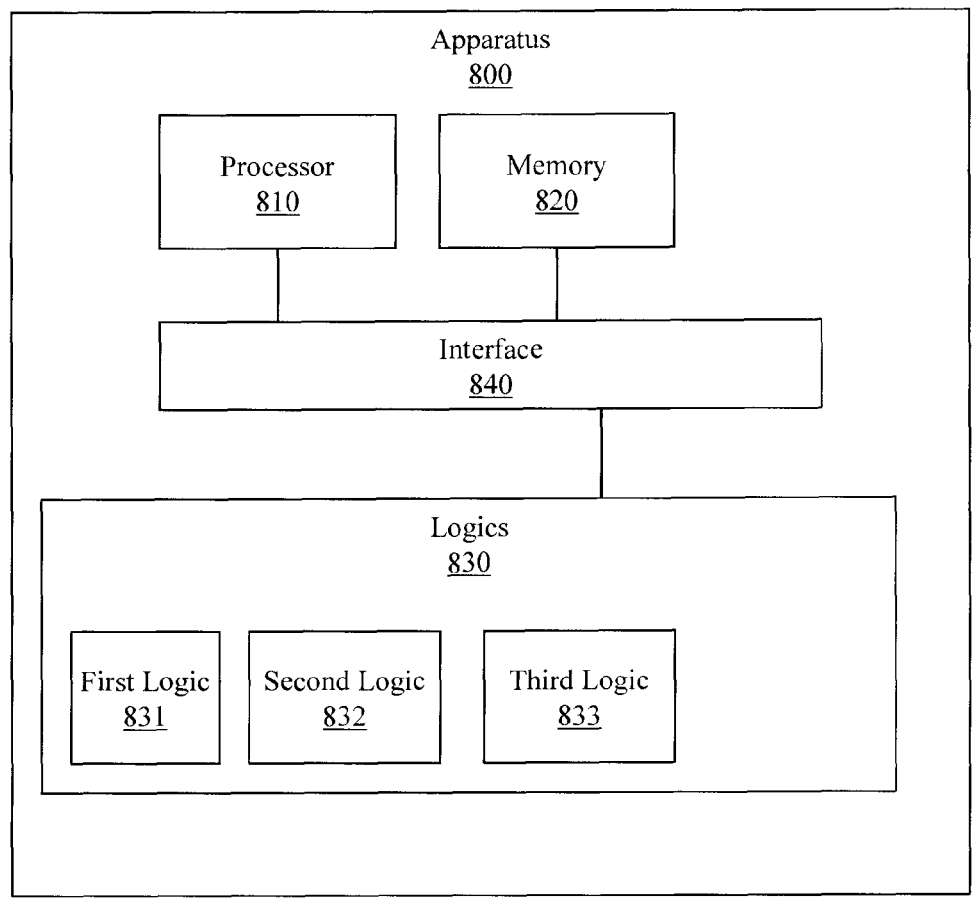
FIG. 8 illustrates an example apparatus that improves HDD performance and efficiency using a log structured block device that performs selective data relocation.

FIG. 8 illustrates an apparatus 800 that improves HDD performance and efficiency using a log structured block device that performs selective data relocation. Apparatus 800 includes a processor 810, a memory 820, and a set 830 of logics that is connected to the processor 810 and memory 820 by an interface 840. Memory 820 may store data about where data blocks were intended to be written on an HDD and where data blocks are actually written on the HDD. Memory 820 may also store data about accesses (e.g., reads) of data blocks on the HDD. More generally, memory 820 may store a heat map and an access map for the HDD.

In one embodiment, the functionality associated with the set of logics 830 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 830 are implemented as ASICs or SOCs. In one embodiment, the first logic 831, the second logic 832, or the third logic 833 may be ASICs, FPGA, or other integrated circuits.

The set 830 of logics includes a first logic 831 that optimizes writes to a hard disk drive. The writes may be optimized by using a serialized log structured block device approach that performs sequential writes. Data that is received may be serialized in the order in which it was received irrespective of origin.

The apparatus 800 also includes a second logic 832 that maintains the block map and the heat map for the hard disk drive. The block map stores location information about data blocks stored on the hard disk drive. The location information may be stored on a per block basis. The location information may include, for example, a current location of a data block and a target location of a data block. The target location may be identified using organizational data. The organizational data may include, for example, file origin information, desired neighbor information, or other information.

The heat map stores access data about data blocks stored on the hard disk drive. The heat map may store read data on a per block basis. The access data value is directly proportional to the number of times a data block has been accessed (e.g., read) recently. The access data may record, for example, the number of times a data block has been read within a relevant time frame. Thus, the second logic 832 may maintain the heat map by incrementing a value for a data block each time it is read. While incrementing is described, other manipulations may be employed. Since recent read activity may be more important to current disk performance than past read activity, the access data may be manipulated to age out or otherwise de-emphasize older read activity. For example, the second logic 832 may periodically subtract a value from the access data for data blocks. In one embodiment, the access data for all data blocks may be decreased at the same time. The second logic 832 may also subtract a value from the access data for data blocks in response to an event (e.g., threshold number of write occurring, threshold number of reads occurring). For example, if the disk is only being written to, and there are very few reads, it may not be worthwhile to distinguish data blocks based on read frequency. In this case, the access data may only be manipulated after a certain number of reads have occurred, after the disk is more than a certain percent full, or upon the occurrence of another event that indicates it may be worthwhile to start tracking read activity.

The apparatus 800 also includes a third logic 833 that optimizes reads for the hard disk drive by selectively relocating data on the hard disk drive. The data blocks are relocated to increase a likelihood or length of a sequential read. Which data blocks are relocated is based, at least in part, on the block map and the heat map. In one embodiment, the third logic 833 selectively relocates data blocks having similar values in their access data to similar regions of the hard disk drive. For example, data blocks having similar read counts may be moved to a similar region of the hard disk drive. By way of illustration, data blocks that are in the top ten percent with respect to read counts may be moved to a first set of cylinders while data blocks that in the bottom ten percent with respect to read counts may be moved to a second set of cylinders. Data blocks that are neither in the top or bottom ten percent may be considered uninteresting and not relocated. In one embodiment, read counts may be binned into a finite number of bins corresponding to a number of regions on the hard disk drive. Data blocks may then be relocated based on bin membership. In one embodiment, the similar regions of the hard disk drive are arranged in order from the outer cylinders of the hard disk drive to the inner cylinders of the hard disk drive, where the order is a function of the access count of blocks in the region.

Once data blocks are located with other data blocks having similar read counts, the data blocks may be further repositioned. In one embodiment, the third logic 833 selectively relocates data blocks within a region so that data blocks having organizational data identifying that the data blocks are intended to be read sequentially are positioned to facilitate being read sequentially. For example, data blocks from a common file that end up in a similar region may be positioned beside each other based on the heuristic that data from the same file may be read together.

More generally, the methods and apparatus described herein may be part of a system that includes a hard disk drive, a computer, and a data store efficiency apparatus. The computer runs a log structured block device process for the hard disk drive. The log structured block device process serializes data blocks to be written on the hard disk drive, causes the serialized data blocks to be written sequentially to the hard disk drive, and then stores data about the actual location for data blocks stored on the hard disk drive. In addition to information about where a data block was actually stored, the log structured block device also stores data about desired neighboring blocks for a data block. As data blocks are read, the process stores read counts for data blocks on the hard disk drive. To identify more recent read activity, the process periodically decrements read counts for data blocks on the hard disk drive. With information about the read behavior being experienced by data blocks on the hard disk drive available, the garbage collection process for the hard disk drive can be enhanced to produce improvements over conventional systems. Thus, the system includes a data storage efficiency apparatus that selectively relocates data blocks on the hard disk drive to store blocks with similar read counts within a threshold number of cylinders on the hard disk drive and to store blocks that are desired neighboring blocks on the same cylinder on the hard disk drive. More generally, data blocks that are experiencing similar read behavior may be grouped together in a geographically related set of cylinders or tracks on the hard disk drive. Data blocks that end up in the same geographic area may then be further relocated to increase the likelihood of sequential reads by considering data including file origins, file orders, or data block orders.

In one embodiment, a hard disk drive may be configured with an application specific integrated circuit (ASIC) or other integrated circuit that is configured to provide a log structured block device for the hard disk drive. The log structured block device serializes data blocks to be written on the hard disk drive, causes the serialized data blocks to be written sequentially to the hard disk drive, and then stores data about the actual location for data blocks stored on the hard disk drive. In addition to information about where a data block was actually stored, the log structured block device also stores data about desired neighboring blocks for a data block. As data blocks are read, the process stores read counts for data blocks on the hard disk drive. To identify more recent read activity, the process periodically decrements read counts for data blocks on the hard disk drive. With information about the read behavior being experienced by data blocks on the hard disk drive available, the garbage collection process for the hard disk drive can be enhanced to produce improvements over conventional systems. Thus, the system includes a data storage efficiency apparatus that selectively relocates data blocks on the hard disk drive to store blocks with similar read counts within a threshold number of cylinders on the hard disk drive and to store blocks that are desired neighboring blocks on the same cylinder on the hard disk drive. More generally, data blocks that are experiencing similar read behavior may be grouped together in a geographically related set of cylinders or tracks on the hard disk drive. Data blocks that end up in the same geographic area may then be further relocated to increase the likelihood of sequential reads by considering data including file origins, file orders, temporal read behavior, or data block orders.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable storage medium storing computer-executable instructions that when executed by a computer cause the computer to perform a method that provides a log structured block device for a hard disk drive, the method comprising:

receiving data to be stored on a hard disk drive (HDD), where the HDD has at least one spinning platter, and where the spinning platter is configured with a plurality of concentric writeable cylinders;

serializing the data to be stored into serialized data;

writing the serialized data onto the HDD as a series of data blocks using a sequential write operation;

maintaining a block map for the HDD, where the block map includes information about locations at which data blocks on the HDD were intended to be stored on the HDD and includes information about locations at which data blocks are actually stored on the HDD;

maintaining an access map that stores values associated with accesses to data blocks stored on the HDD, where maintaining the access map includes, upon determining that a target data block on the HDD has been accessed, manipulating a value in the access map for the target data block to indicate that the target data block has experienced another access; and selectively relocating a selected data block stored on the HDD as part of a garbage collection process based, at least in part, on the block map and the access map, where selectively relocating the selected data block includes identifying a set of data blocks on the HDD, where members of the set of data blocks have an access value within a range, and moving the selected data block to a location on the HDD that is within a threshold distance of the set of data blocks.

2. The non-transitory computer-readable storage medium of claim 1, where selectively relocating the selected data block includes identifying, within the set of data blocks, a subset of data blocks that were meant to be stored contiguously, and moving at least one member of the subset of data blocks so that at least two members of the subset are stored contiguously.

3. The non-transitory computer-readable storage medium of claim 1, where manipulating the value in the access map for the target data block to indicate that the target data block has experienced another access includes incrementing the value or increasing the value.

4. The non-transitory computer-readable storage medium of claim 1, where maintaining the access map includes, periodically or in response to an event, manipulating the values of data blocks in the access map to indicate that the target data block has experienced one or more fewer accesses.

5. The non-transitory computer-readable storage medium of claim 4, where manipulating the values in the access map to indicate that the target data block has experienced one or more fewer accesses includes decrementing the values or decreasing the values.

6. The non-transitory computer-readable storage medium of claim 1, where selectively relocating the selected data block includes positioning the selected data block with respect to the outermost cylinder on the HDD so that the distance of the selected data block from the outermost cylinder on the HDD is inversely proportional to the value in the access map associated with the selected data block.

7. The non-transitory computer-readable medium of claim 1, where selectively relocating the selected data block includes moving the selected data block to a different HDD.

8. The non-transitory computer-readable storage medium of claim 2, where the information about locations at which data blocks on the HDD were intended to be stored includes actual block addresses on the HDD or information identifying an intended immediately preceding data block for an individual block or information identifying an intended immediately succeeding data block for the individual block.

9. The non-transitory computer-readable storage medium of claim 8, where serializing the data to store into serialized data includes arranging the data to store in the order in which the data to store was received.

10. The non-transitory computer-readable storage medium of claim 9, where serializing the data to store into serialized data includes moving a data block out of the order in which it was received and into an order determined by the presence of a related data block.

11. The non-transitory computer-readable storage medium of claim 1, where the HDD is a shingled magnetic recording (SMR) device.

12. An apparatus, comprising:
a processor;
a memory that stores a block map and a heat map;
a set of logics; and
an interface that connects the processor, the memory, and the set of logics;
the set of logics comprising:
a first logic that optimizes writes to a hard disk drive using a serialized log structured block device approach that performs sequential writes;
a second logic that maintains the block map and the heat map for the hard disk drive, where the block map stores location information about data blocks stored on the hard disk drive on a per block basis, where the location information includes a current location of a data block and a target location of a data block, and where the heat map stores access data about data blocks stored on the hard disk drive on a per block basis, where the access data is directly proportional to the number of times a data block has been accessed,
where the second logic maintains the block map by storing data about an actual location for a data block on the hard disk drive and by storing organizational data about the data block,
where the second logic maintains the heat map by adding a value to the access data for an accessed data block upon determining that the accessed data block has been accessed;
where the second logic maintains the heat map by periodically or in response to an event subtracting a value from the access data for data blocks; and
a third logic that optimizes reads for the hard disk drive by selectively relocating data on the hard disk drive to increase a likelihood or length of a sequential read based, at least in part, on the block map and the heat map.

13. The apparatus of claim 12, where the third logic selectively relocates data blocks having similar values in their access data to similar regions of the hard disk drive.

14. The apparatus of claim 13, where the third logic selectively relocates data blocks within a region on the hard disk drive so that data blocks having organizational data identifying that the data blocks are intended to be read sequentially are positioned to facilitate being read sequentially.

15. The apparatus of claim 13, where the similar regions of the hard disk drive are arranged in order from the outer cylinders of the hard disk drive to the inner cylinders of the hard disk drive, where the order is a function of the access count of blocks in the region.

\* \* \* \* \*